United States Patent
Rafaelof

(10) Patent No.: US 6,760,195 B2
(45) Date of Patent: Jul. 6, 2004

(54) INTRINSICALLY EXCITABLE ACTUATOR ASSEMBLY

(75) Inventor: Menachem Rafaelof, Superior, CO (US)

(73) Assignee: Seagate Technology LLC, Scotts Valley, CA (US)

(*) Notice: Subject to any disclaimer, the term of this patent is extended or adjusted under 35 U.S.C. 154(b) by 212 days.

(21) Appl. No.: 09/836,010

(22) Filed: Apr. 17, 2001

(65) Prior Publication Data

US 2001/0038514 A1 Nov. 8, 2001

Related U.S. Application Data

(60) Provisional application No. 60/198,168, filed on Apr. 17, 2000.

(51) Int. Cl.$^7$ .......................... G11B 5/56; G11B 21/24
(52) U.S. Cl. ............................... 360/264.3; 360/294.4
(58) Field of Search .................... 360/264.3, 75, 360/77.05, 77.02, 77.06, 78.12, 294.3, 294.4; 310/311, 314, 317, 323, 328, 330, 348

(56) References Cited

U.S. PATENT DOCUMENTS

| | | | | |
|---|---|---|---|---|
| 4,188,645 A | * | 2/1980 | Ragle et al. | 360/75 |
| 4,374,402 A | * | 2/1983 | Blessom et al. | 360/266.2 |
| 4,969,058 A | | 11/1990 | Williams et al. | 360/77.03 |
| 5,276,573 A | | 1/1994 | Harada et al. | 360/103 |
| 5,282,190 A | | 1/1994 | Maruo et al. | 369/115 |
| 5,351,412 A | | 10/1994 | Furuhata et al. | 33/568 |
| 5,418,418 A | | 5/1995 | Hirano et al. | 310/328 |
| 5,423,207 A | | 6/1995 | Flechsig et al. | 73/104 |
| 5,453,653 A | * | 9/1995 | Zumeris | 310/323.16 |
| 5,657,188 A | | 8/1997 | Jurgenson et al. | 360/106 |
| 5,757,573 A | | 5/1998 | Tokuyama et al. | 360/75 |
| 5,761,006 A | | 6/1998 | Sri-Jayantha et al. | 360/106 |
| 5,793,571 A | | 8/1998 | Jurgenson et al. | 360/104 |
| 5,856,896 A | | 1/1999 | Berg et al. | 360/104 |
| 5,867,347 A | | 2/1999 | Knight et al. | 360/104 |
| 5,898,544 A | | 4/1999 | Krinke et al. | 360/104 |

(List continued on next page.)

FOREIGN PATENT DOCUMENTS

| | | | | | |
|---|---|---|---|---|---|
| JP | 60035383 A | * | 2/1985 | | G11B/21/10 |
| JP | 04178979 A | * | 6/1992 | | G11B/21/02 |
| JP | 04248170 A | * | 9/1992 | | G11B/21/02 |
| JP | 04258853 A | * | 9/1992 | | G11B/21/02 |
| JP | 05135518 A | * | 6/1993 | | G11B/21/02 |
| JP | 06243606 A | * | 9/1994 | | G11B/21/02 |
| JP | 2000040313 A | * | 2/2000 | | G11B/21/02 |

OTHER PUBLICATIONS

Full–English translation of Tsukada (JP 4–248170).*
"Actuator Controlled by Ultrasonic Motor," Dec. 1991, IBM Technical Disclosure Bulletin, vol. No. 34, Iss. No. 7B, pp. 399–402.*
"Piezoelectric Actuator for Small Hard Disk Drive," Feb. 1993, IBM Technical Disclosure Bulletin, vol. No. 36, Iss. No. 2, pp. 379–380.*

*Primary Examiner*—William Klimowicz
(74) *Attorney, Agent, or Firm*—Merchant & Gould P.C.

(57) ABSTRACT

A method and system for positionally displacing a transducer, or multiple transducers, over a location on a data storage medium is disclosed. An actuator assembly containing at least one actuator arm supporting at least one transducer is used to access a desired location on the data storage medium. The actuator arm contains an intrinsically excitable element, such as piezoelectric material, responsive to a control signal to produce an excitement. The excitement in the element generates a movement of the element that is magnified by a flexure to positionally displace the transducer, which is attached to the flexure. The transducer is displaced from a current, or origination, location to the desired location.

20 Claims, 6 Drawing Sheets

U.S. PATENT DOCUMENTS

| | | | |
|---|---|---|---|
| 5,920,441 A | 7/1999 | Cunningham et al. | 360/78.05 |
| 5,943,189 A | 8/1999 | Boutaghou et al. | 360/103 |
| 6,002,549 A | 12/1999 | Berman et al. | 360/104 |
| 6,005,742 A | 12/1999 | Cunningham et al. | 360/78.05 |
| 6,052,251 A | 4/2000 | Mohajerani et al. | 360/78.05 |
| 6,078,468 A * | 6/2000 | Fiske | 360/97.01 |
| 6,078,471 A * | 6/2000 | Fiske | 360/254.2 |
| 6,088,199 A | 7/2000 | Lee et al. | 360/135 |
| 6,108,175 A * | 8/2000 | Hawwa et al. | 360/294.4 |
| 6,118,637 A | 9/2000 | Wright et al. | 360/294.4 |
| 6,201,668 B1 * | 3/2001 | Murphy | 360/294.4 |
| 6,233,124 B1 * | 5/2001 | Budde et al. | 360/294.4 |
| 6,239,534 B1 * | 5/2001 | Takeuchi et al. | 310/328 |
| 6,327,120 B1 * | 12/2001 | Koganezawa et al. | 360/294.4 |
| 6,407,481 B1 * | 6/2002 | Takeuchi et al. | 310/324 |

* cited by examiner

INTRINSICALLY EXCITABLE ACTUATOR ASSEMBLY

Related Applications

This application claims priority of U.S. provisional application Serial No. 60/198,168, filed Apr. 17, 2000.

FIELD OF THE INVENTION

This application relates generally to a disc drive and more particularly to an actuator assembly of the disc drive.

BACKGROUND OF THE INVENTION

One function of a disc drive is reliable storage and retrieval of information. Using one common implementation of a disc drive as an example, data is stored on one or more discs coated with a magnetizable medium. Data is written to the discs by an array of transducers, typically referred to as read/write transducers, mounted to an actuator assembly for movement of the transducers relative to the discs. The information is stored on a plurality of concentric circular tracks on the discs until such time that the data is read from the discs by the read/write transducers. Each of the concentric tracks is typically divided into a plurality of separately addressable data sectors. The transducers are used to transfer data between a desired track and an external environment. During a write operation, data is written onto the disc track and during a read operation the transducer senses the data previously written on the disc track and transfers the information to the external environment. Critical to both of these operations is the accurate locating of the transducer over the center of the desired track.

Conventionally, the transducers are positioned with respect to the disc surfaces by an actuator arm controlled through a voice coil motor. The voice coil motor is responsible for pivoting the actuator arm about a pivot shaft, thus moving the transducers across the disc surfaces. The actuator arm thus allows the transducers to move back and forth in an accurate fashion between an inner radius and an outer radius of the discs. The actuator arm is driven by a control signal fed to the voice coil motor at the rear end of the actuator arm. A servo control system is used to sense the position of the actuator arm and control the movement of the transducer above the disc using servo signals read from the servo segments on the disc surface in the disc drive. The servo control system relies on servo information stored on the disc. The signals from this information generally indicate the present position of the transducer with respect to the disc, i.e., the current track position. The servo control system uses the sensed information to maintain transducer position or determine how to optimally move the transducer to a new position centered above a desired track. The servo system then delivers a control signal to the voice coil motor to rotate the actuator arm to position the transducer over a desired new track or maintain the position over the desired current track.

As the demand for smaller disc drives increases, so does the demand for higher storage capacities. To meet this demand, manufacturers of disc drives are continually developing smaller yet higher storage capacity drives. Typically, to increase the storage capacity of a disc drive, the density of the concentric tracks on the disc is increased. In order to increase the track density, manufacturers either narrow the width of the concentric tracks or reduce the spacing between tracks.

Currently, most drives are limited to a track density around 50,000 tracks per inch. As the demand for a higher storage capacity continues to increase, so will the need for a track density higher than the conventional 50,000 tracks per inch. However, current drive track density is limited by various characteristics associated with the dynamic behavior of the actuator arm and voice coil motor assembly. A conventional actuator arm and voice coil motor assembly moves an attached read/write transducer over a large dynamic range. This large dynamic range hinders disc drive manufacturers from developing drives having a higher track density. As the track density increases, it becomes increasingly difficult for the servo system to accurately position the read/write transducer over the desired servo track.

One potential solution is to employ a microactuator for fine position control in addition to the conventional actuator, thereby effecting transducer positioning through dual-stage actuation. Various microactuator designs have been considered to accomplish high-resolution transducer positioning, including piezoelectric, electromagnetic, electrostatic, capacitive, fluidic, and thermal actuators. Additionally, various locations for the microactuator have been suggested, including on the slider and various other positions on the actuator arm. With regard to dual-stage actuation, the microactuator is a high-resolution actuator responsible for fine control of the read/write transducers attached to the microactuators and not accessing the entire surface of the disc. Accordingly, the actuator arm voice coil motor assembly is responsible for accessing tracks when seeking greater distances, i.e. low-resolution actuation.

SUMMARY OF THE INVENTION

Against this backdrop the present invention has been developed. The present invention is an intrinsically excitable actuator assembly allowing a transducer assembly a full range of access over a data storage medium. The intrinsically excitable actuator assembly includes an intrinsically excitable element that is excited in response to a control signal. The excitement of the intrinsically excitable element produces a movement of the element that is magnified by a motion amplification system. The magnification of the element movement results in positionally displacing a transducer assembly to access a desired location on the data storage medium. In accordance with a certain embodiment of the present invention, the intrinsically excitable element is piezoelectric material. The piezoelectric material is excited by a voltage, or electrical potential, applied to the material. Alternatively, the element may be constructed from a material with high magnetostrictive properties.

In accordance with still other embodiments, the present invention relates to a device for positioning a transducer assembly, in response to a signal from a controller, at any desired location relative to a data storage medium in order to write data to and read data from the medium. The device includes an elongated flexure supporting the transducer assembly and operable to position the transducer assembly over the desired location on the storage medium. The device also comprises an intrinsically excitable element contacting the flexure. The excitable element moves in response to an excitation produced by the signal from the controller and the flexure is configured to amplify the element movement to selectively position the transducer assembly over the desired location on the data storage medium.

In accordance with certain embodiments of the present invention, the data storage medium may be a recordable disc in a disc drive and the transducer assembly writes data to and reads data from a desired track of the recordable disc. The device may further include an actuator arm supporting the elongated flexure. The actuator arm is attached to a stationary support and has an interior surface constraining the intrinsically excitable element such that the movement produced by the excitation is concentrated to a point of contact between the intrinsically excitable element and the elongated flexure.

In accordance with still other embodiments, the present invention relates to a method for positioning a transducer assembly, in response to a signal from a controller, at any desired location relative to a data storage medium in order to access, or write data to and read data from, the medium. The method includes determining a control parameter associated with the signal to position a transducer assembly over a desired location on the medium. The control parameter is determined based upon a current location being accessed on the data storage medium. The method also includes exciting an intrinsically excitable element using the control parameter. The excitement produces a movement of the intrinsically excitable element. The method also includes amplifying the movement to selectively position a transducer assembly over the desired location on the data storage medium.

These and various other features, as well as advantages which characterize the present invention, will be apparent from a reading of the following detailed description and a review of the associated drawings.

DETAILED DESCRIPTION

Figure 1:
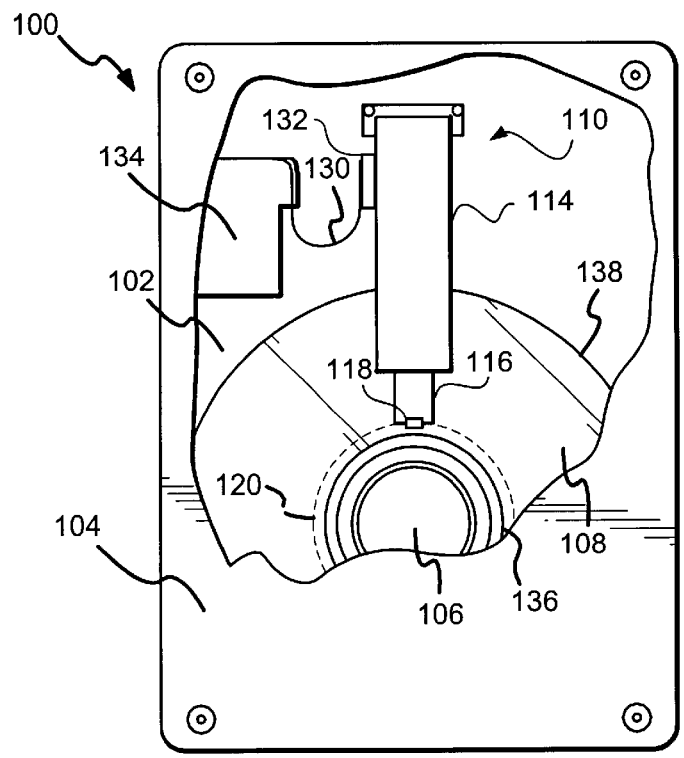
FIG. 1 is a plan view of a disc drive having an actuator assembly and incorporating an embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive 100 in a conventional manner. The components include a spindle motor 106, which rotates one or more data storage discs 108 at a constant high speed. A magnetic media disc 108 is used to illustrate a preferred embodiment of the present invention, but the present invention may be implemented using other types of data storage discs. Information is written to and read from tracks on the discs 108 between an inner diameter 136 and an outer diameter 138 through the use of an actuator assembly 110. The actuator assembly 110 includes an actuator arm 114 extending towards the disc 108. One or more flexures 116 extend from the actuator arm 114 and support a transducer assembly 118. Although the transducer assembly 118 is shown in FIG. 1 as a single transducer 118, the transducer assembly 118 may be a configuration of multiple transducers 118, with each transducer 118 spaced by the flexure 116 to access, or write to and read from, a predetermined radial segment of the disc 108. As mentioned, mounted at the distal end of the flexure 116 is the transducer 118, which includes an air-bearing slider enabling the transducer 118 to fly in close proximity above the corresponding surface of the associated disc 108. In accordance with another embodiment, the actuator assembly 110 might include multiple actuator arms 114. Additionally, the actuator arm 114, or arms, may be attached to multiple flexures 116 with each flexure having an attached transducer assembly 118.

The spindle motor 106 is typically de-energized when the disc drive 100 is not in use for extended periods of time. The transducer 118 is typically moved over park zones 120 near the inner diameter 136 of the discs 108 when the spindle motor 106 is de-energized. The transducer 118 is secured over the park zone 120 through the use of a controlled voltage, which positions the transducer 118 over the park zones 120 at a voltage defined during disc drive 100 development. Alternatively, ramps (not shown) near the outer diameter 138 may be used to lift the transducer 118 away from the surface of the disc 108. The disc 108 may contain park zones between the outer diameter 138 and the inner diameter 136.

A flex assembly 130 provides the requisite electrical connection paths for the actuator assembly 110 while allowing movement of the actuator assembly 110 during operation. The flex assembly 130 includes a preamplifier printed circuit board 132 to which transducer wires (not shown) are connected; the transducer wires being routed along the actuator arms 114 and the flexures 116 to the transducer 118. The printed circuit board 132 typically includes circuitry for controlling the write currents applied to the transducer 118 during a write operation and a preamplifier for amplifying read signals generated by the transducer 118 during a read operation. The flex assembly terminates at a flex bracket 134 for communication through the base deck 102 to a disc drive printed circuit board (not shown) mounted to the bottom side of the disc drive 100.

During a seek operation, the track position of the transducer 118 is controlled through the use of an intrinsically excitable element located within or fastened to the actuator arm 114. In accordance with an exemplary embodiment, the intrinsically excitable element may be a piezoelectric material. The piezoelectric material might be bulk Lead Zirconate Titanate (PZT) or any other piezoelectric material that can be intrinsically excited. The piezoelectric material may be used in bulk, or block, form or deposited as a thin film using various techniques such as sputtering. In accordance with an alternative embodiment, the intrinsically excitable element might be constructed from a material with high magnetostrictive properties. Magnetostrictive properties are properties of certain materials that expand and contract when exposed to a magnetic field. In yet other embodiments, the intrinsically excitable element might be constructed from an electrostrictive material such as Lead Magnizium Niobate (PMN). Electrostrictive properties are properties of certain materials that expand and contract when exposed to an electric field.

For piezoelectric materials, two electrodes, or electrical contacts, are provided on the surface of the bulk material for initial poling of the material and subsequent actuation. The controlled application of voltage across these electrodes (along the poling axis) results in alignment of the material internal domains and, depending on the polarity of the applied potential either to contraction or extension of the material along the poling axis. Deformation of the material along its poling axis directly results in extension or contraction of the material along the two orthogonal axes to the poling axis. The motion of a piezoelectric material along its longitudinal axis is used to achieve motion. The flexure 116 extends and retracts in response to the movement by the piezoelectric material, thereby causing the transducer 118 to move across the surface of the disc 108.

Figure 2:
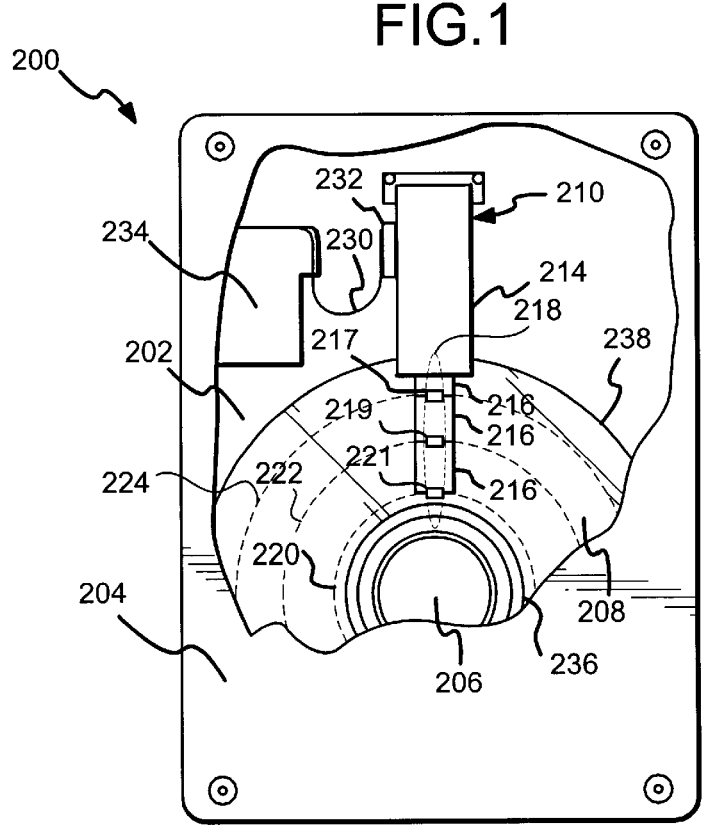
FIG. 2 is a plan view of a disc drive having an actuator assembly and incorporating an alternative embodiment of the present invention showing the primary internal components.

An actuator assembly 210 having an actuator arm 214 for positioning a transducer assembly 218 in accordance with one embodiment of the present invention is shown in FIG. 2. The transducer assembly 218 in FIG. 2 is a configuration of multiple transducers. The actuator arm 214 supports a flexure 216 that magnifies movement of an intrinsically excitable element excited in response to a control voltage as described in conjunction with FIG. 1. The flexure 216 supports the transducer assembly 218 over the surface of the disc 208. The transducer assembly 218 contains more than one transducer, such as a first transducer 217, a second transducer 218, and a third transducer 221. The transducer assembly 218 may contain as many transducers, e.g. 217, 219, 221, as necessary in order to access every track on the disc 208. The number of transducers, e.g. 217, 219, 221, is based upon a maximum range of displacement, or motion, of each transducer, e.g. 217, 219, 221, across the surface of the disc 208.

With the exception of being constructed with the multiple transducer configuration of the transducer assembly 218, the disc drive 200 is identical to the disc drive 100 shown in FIG. 1. The spindle motor 206 is typically de-energized when the disc drive 200 is not in use for extended periods of time. In this case, each of the multiple transducers, e.g. 217, 219, 221, would be positioned over an inner park zone 220, a middle park zone 222, or an outer park zone 224 when the drive motor is de-energized. The disc drive 200 may contain more than one middle park zone 204 if the actuator assembly 210 contains more than three transducers, e.g. 217, 219, 221.

Figure 3:
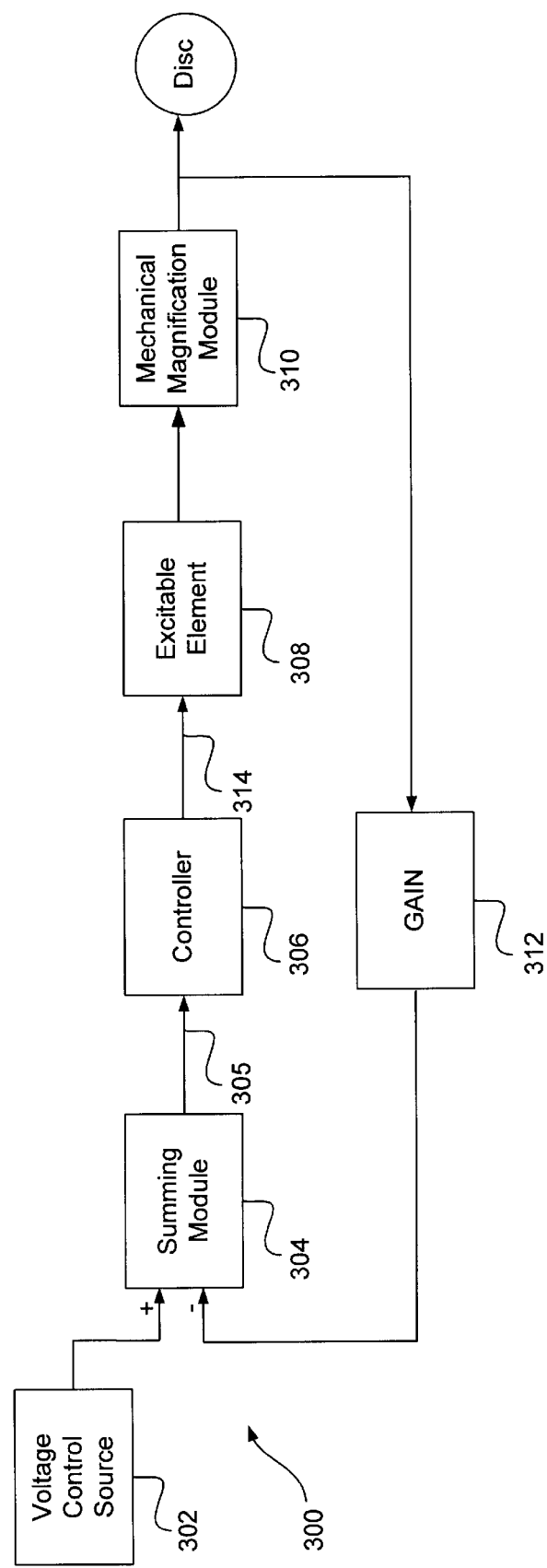
FIG. 3 is a functional block diagram generally showing the main functional components used to position a transducer assembly at a desired location on a data storage medium in accordance with an exemplary embodiment of the present invention.

A functional diagram of a motion amplification system 300 for controlling a transducer assembly 118 (FIG. 1), such as the single transducer 118 configuration of FIG. 1, over the surface of a disc 108 (FIG. 1) in a disc drive 100 (FIG. 1) in accordance with one embodiment is shown in FIG. 3. The output of the motion amplification system 300 positions the transducer 118 at any radial position within the range of motion of the transducer 118 between the outer diameter 138 (FIG. 1) and the inner diameter 136 (FIG. 1) on the surface of a disc 108 to be accessed. By controlling the position of the transducer 118, any track, and thus segment of data, within the range of motion of the transducer 118 on the surface of the disc 108 may be accessed under control of the motion amplification system 300. The motion amplification system 300 sacrifices larger ranges of motion across the disc 108 surface such that smaller ranges of motion (e.g., 2 cm compared to 200 microns) may be accessed in order to achieve much greater precision. Such precision will allow storage and retrieval of data in disc drives 100 having extremely high track densities. Accordingly, the same amount of data presently stored on one surface of a current drive 100 (r~25 mm) may be stored on a radial distance extending only fraction of a millimeter. Furthermore, reduced range of motion and size of the actuator assembly 110 (FIG. 1) will eliminate dynamic effects to achieve shorter access time to data, reduced acoustics, and reduced overall size of the disc drive 100.

The motion amplification system 300 is driven by an error signal 305 that is proportional to the difference between the desired position and the actual current position. A voltage input provided by the voltage control source 302 is fed into a summing module 304. The voltage input represents the desired location on the disc 108 to be accessed by a transducer 118. The voltage input is compared by the summing module 304 to a voltage representative of the actual location currently being accessed in order to generate the error signal 305. Specifically, this voltage associated with the current, or origination, location of the transducer 118 on the disc 108 is subtracted from the voltage input from the voltage control source 302 to produce the error signal 305. The magnitude of the error signal 305 is used to control the output of the motion amplification system 300 such that a transducer 118 is displaced to the desired, or destination, location on the disc 108.

A controller 306 uses the error signal from the summing module 304 to control the voltage being applied to an intrinsically excitable element 308. The intrinsically excitable element 308 is preferably a piezoelectric material. Excitation in the intrinsically excitable element 308 is accomplished by applying a control voltage from the controller 306 between electrical contacts, or surface electrodes, of the piezoelectric material. The control voltage is a control parameter associated with a control signal 314 that corresponds to the positional displacement needed to access the desired location from the current location.

The movement of the intrinsically excitable element 308 is magnified by a mechanical magnification device 310 to position a transducer 118 at a desired location on the disc 108. For example, the mechanical magnification device 310 may be a flexure 116 (FIG. 1) attached to an actuator arm 114 (FIG. 1) of an actuator assembly 110. The flexure 116 may support either the transducer 118 over the surface of the disc 108, as shown in FIG. 1, or a multiple transducer configuration 218, as shown in FIG. 2. Alternatively, the mechanical magnification device 310 might be multiple flexures 216 (FIG. 2) connected to an actuator arm 214 (FIG. 2) of an actuator assembly 210 (FIG. 2). In yet other embodiments, the mechanical magnification device 310 might include multiple actuator arms 114, each having a separate flexure 116.

Regardless of the embodiment, the mechanical magnification device 310 amplifies the movement caused by the excitation realized in the intrinsically excitable element 308. The output of the motion amplification system 300 drives a transducer 118 to a desired location on the disc 108 as directed by the controller 306. Positional displacement information of the displaced transducer 118 is fed back through a finite gain module 312 to the summing module 304. At the summing module 304, the positional displacement information is subtracted from the voltage input, which represents the desired position command, emanating from the voltage control source 302 in order to represent the error signal 305 transmitted to the controller 306.

Figure 8:
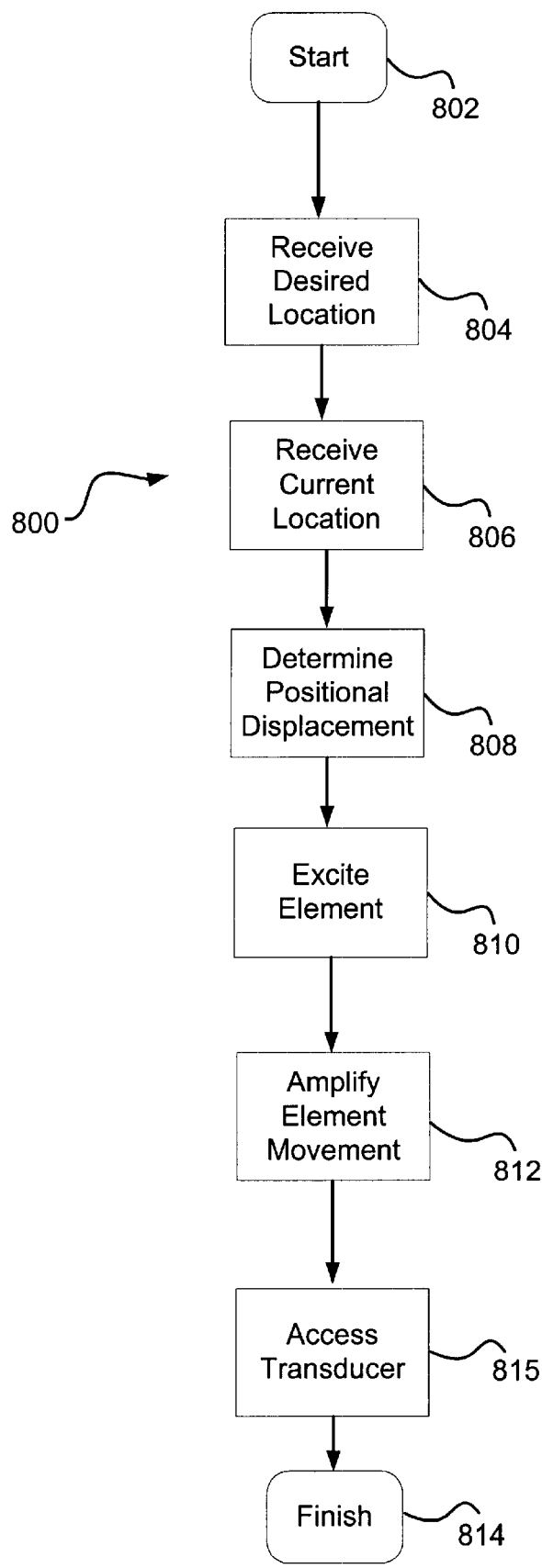
FIG. 8 is an operational flow diagram generally showing operational sequences need to position a transducer assembly over a desired location on a data storage medium.

A flow diagram 800 illustrating operational characteristics related to positioning a transducer assembly 118 (FIG. 1), such as the single transducer 118 configuration of FIG. 1, relative to a location on a recordable disc 108 (FIG. 1) in accordance with an exemplary embodiment of the present invention is shown in FIG. 8. Although the flow diagram 800 of FIG. 8 is illustrated below as used in a disc drive 100 (FIG. 1), the operational control described may find similar utility in other data storage devices, such as an optical disc drive, a DVD, or any other form of a data storage device where a data storage medium is accessed by a transducer 118. Operation control begins in start operation 802. Start operation 802 is preferably initiated as a request from a host computer directing the disc drive 100 to access a desired location on a recordable disc 108 of the disc drive 100. Operation control then passes from start operation 802 to destination receive operation 804.

In destination receive operation 804, a request to position the transducer 118 over a desired, or destination, location is received. In origination receive operation 806, positional information related to the current location of the transducer 118 over a current track location on the disc 108 is received. Once both the desired and the current transducer 118 locations are received, operation control passes to displacement operation 808. In displacement operation 808, the control parameter related to the amount of positional displacement needed to move the transducer 118 from the origination location to the destination location is determined. This determination is based upon the information received in destination receive operation 804 and origination receive operation 806.

In an embodiment incorporating the single transducer 118 configuration of FIG. 1, the positional displacement determined requires displacement of the transducer 118 positioned at the origination location to effectuate accessing from the origination location to the destination location. In an alternative embodiment incorporating the multiple transducer configuration 218 shown in FIG. 2, the positional displacement determined may require displacement of a separate transducer, e.g., 217, than the transducer, e.g., 219, positioned at the current location to effectuate accessing from the current location to the destination location. In multiple transducer 218 configurations, the displacement operation 808 determines, based upon actuator assembly 210 design, which transducer, e.g., 217, 219, 221, in the multiple transducer configuration 218 needs to be displaced in order to execute the request performed.

Once displacement operation 808 has determined the appropriate control parameter associated with the positional displacement needed to access a transducer 118 from the current location to the desired location, operation control passes to an excitation operation 810. In excitation operation 810, the control parameter is used to excite an intrinsically excitable element. If the intrinsically excitable element is a piezoelectric material, the control parameter is preferably a voltage. The intrinsically excitable element moves in response to the excitation, e.g., the voltage. The degree, direction, and intensity of the movement are dictated, at least in part, by the control parameter, shape of the element, and the positioning of electrical contacts responsible for communicating the control parameter to the piezoelectric material. The electrical contacts of the piezoelectric material, the positioning of which determine, at least in part, the degree, direction, and intensity of the movement.

Following excitation in the intrinsically excitable element, operation control passes to amplification operation 812. In amplification operation 812, the movement produced in the excitable element is amplified, or magnified, in response to the excitation. The amount of amplification corresponds to the control parameter such that the amplification results in positional displacement of a transducer 118 to the desired location. The amplification is preferably a mechanical amplification administered with a flexure 116 having an attached transducer 118. The flexure 116, as will be seen in FIG. 4 and FIG. 5, is preferably a non-rigidly supported member of an actuator arm 114.

Once the amplification operation 812 has amplified the movement of the intrinsically excitable element, operation control passes to access operation 815. In access operation 815, the transducer 118 is positionally displaced, in response to the amplification, from the current location to the desired location so that the transducer 118 reads from or writes to the disc 108. Positional displacement at this point is typically referred to as "track following." Once the transducer 118 has accessed the desired location, operation control is terminated with finish operation 814.

Figures 4, 5:
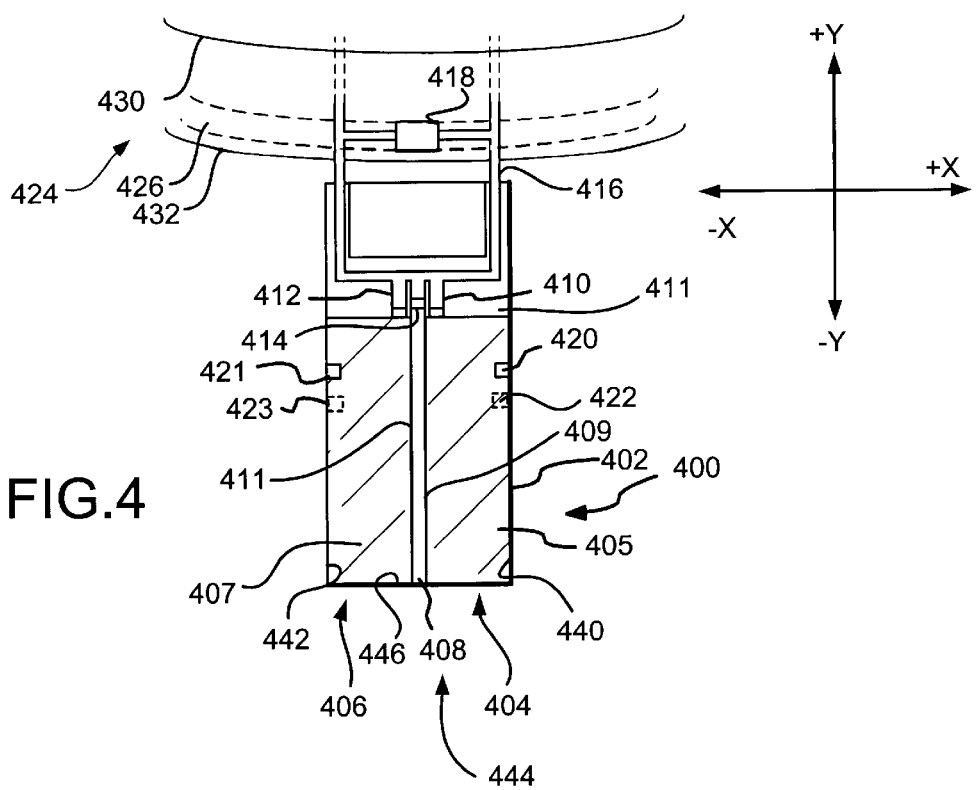
FIG. 4 is a plan view of an actuator assembly, such as an actuator assembly shown in either FIG. 1 of FIG. 2, showing the main functional components used to position a transducer assembly at a desired location on a recordable disc in a disc drive in accordance with one embodiment of the present invention.
FIG. 5 is a plan view of an actuator assembly, such as an actuator assembly shown in either FIG. 1 of FIG. 2, showing the main functional components used to position a transducer assembly at a desired location on a recordable disc in a disc drive in accordance with another embodiment of the present invention.

An actuator assembly 400 and functional components of the actuator assembly 400 used in controlling accessing of a disc 424 by a transducer assembly 418 in accordance with one embodiment of the present invention is shown in FIG. 4. Although the actuator assembly 400 of FIG. 4 is shown as used in a disc drive 100 (FIG. 1), the actuator assembly 400 may find similar utility in other data storage devices, such as an optical disc drive, a DVD, or any other form of a data storage device where a data storage medium is accessed by a transducer assembly 418. The actuator assembly 400 includes an actuator arm 402 having a housing 444 for storing two intrinsically excitable elements, e.g., a first intrinsically excitable element 405 and a second intrinsically excitable element 407. The housing 444 has interior surfaces 440, 442, 446, a top surface (not shown), and a bottom surface 411 for constraining the intrinsically excitable elements 405, 407 within the housing 444.

The housing 444 is preferably divided by a fixed reservoir boundary 408 into a first element reservoir 404 and a second element reservoir 406. The fixed reservoir boundary 408 is a rigid structure having a first surface 409 defining a boundary of the first element reservoir 404 and a second surface 413 defining a boundary of the second element reservoir 406. The first element reservoir 404 is further bounded by the interior surfaces 446 and 440 of the housing 444. Likewise, the second element reservoir 406 is further bounded by the interior surfaces 446 and 442 of the housing 444.

The first element reservoir 404 holds the first piezoelectric element 405 and the second element reservoir 406 holds a second piezoelectric element 407. The first piezoelectric element 405 and the second piezoelectric element 407 may be composed of bulk Lead Zirconate Titanate (PZT). The first piezoelectric element 405 and the second piezoelectric element 407 may be the same or different piezoelectric materials.

The actuator assembly 400 includes a flexure 416 supported by the actuator arm 402. The flexure 416 and the actuator arm 402 are fastened so that the flexure may move in the longitudinal, or Y, direction relative to an outer diameter 432 and an inner diameter 430 of a disc 424. The flexure 416 includes a first motion amplification contact 410 and a second motion amplification contact 412. The first motion amplification contact 410 relays the excitement of the first piezoelectric element 405 to the flexure 416. Likewise, the second motion amplification contact 412 relays the excitation in the second piezoelectric element 407 to the flexure 416.

The flexure 416 also includes a reservoir boundary contact 414. The reservoir boundary contact 414 acts as a bumper, or stop, to minimize potential oscillations of the first motion amplification contact 410 and the second motion amplification contact 412 upon removal of the excitement applied to the piezoelectric materials 405, 407. Movement of the first piezoelectric element 405 presses against the first motion amplification contact 410 thereby moving the flexure 416 towards the disc 424. Likewise, movement of the second piezoelectric element 407 presses against the second motion amplification contact 412 thereby moving the flexure 416 towards the disc 424. The movement of the first motion amplification contact 410 and the second motion amplification contact 412 are amplified by the flexure 416. The flexure 416 supports an attached transducer assembly 418 that is positionally displaced from a current location to a desired location upon movement of the flexure 416. In accordance with a preferred embodiment, the transducer assembly 418 is a single transducer 418.

The first piezoelectric element 405 includes at least one positive electrical contact, or surface electrode, 420 and at least one negative electrical contact, or surface electrode, 422 for exciting the first piezoelectric element 405 with a voltage. The positive electrical contact 420 and the negative electrical contact 422 are deposited on the front and back surfaces, respectively, of first piezoelectric element 405. Since the negative electrical contact 422 is shown located on the back surface of the first piezoelectric element 405, the negative electrical contact 422 is shown in dashed lines in FIG. 4. The positive 420 and negative 422 electrical contacts may be positioned at any location on the first piezoelectric element 405. Likewise, the second piezoelectric element 407 includes at least one positive electrical contact, or surface electrode, 421 and at least one negative electrical contact, or surface electrode, 423 for exciting the second piezoelectric element 407 with a voltage. The positive electrical contact 421 and the negative electrical contact 423 are deposited on the front and back surfaces, respectively, of second piezoelectric element 407. Since the negative electrical contact 423 is shown located on the back surface of the second piezoelectric element 407, the negative electrical contact 423 is shown in dashed lines in FIG. 4. The positive 421 and negative 423 electrical contacts may be positioned at any location on the second piezoelectric element 407. The first piezoelectric element 405 and the second piezoelectric element 407 might contain any number of electrical contacts, e.g., 420, 422 and 421, 423, respectively.

Excitation in the first piezoelectric element 405 occurs as a voltage is applied to the first piezoelectric element 405 through the positive 420 and negative 422 electrical contacts. Likewise, excitation in the second piezoelectric element 407 occurs as a voltage is applied to the second piezoelectric element 407 through the positive 421 and negative 423 electrical contacts. As the first piezoelectric element 405 is excited, the first motion amplification contact 410 relays movement generated by the excitation to the flexure 416. Likewise, as the second piezoelectric element 407 is excited, the second motion amplification contact 412 relays movement generated by the excitation to the flexure 416. The first motion amplification contact 410 and the second motion amplification contact 412, via placement of the contacts 410, 412, act similar to levers in that a force representative of movement of an element, e.g., 405, 407, is applied to the contacts 410, 412, and the contacts 410, 412 amplify the force thereby displacing the flexure 416. If the first piezoelectric element 405 and the second piezoelectric element 407 are excited simultaneously, then the first motion amplification contact 410 and the second motion amplification contact 412 simultaneously relay both excitations to the flexure 416. The flexure 416 mechanically magnifies the excitement of the first 405 and the second 407 piezoelectric elements to produce displacement of the transducer 418 across the surface of the disc 424. The flexure 416 magnifies the movement of at least one of the piezoelectric elements, e.g., 405, 407, to produce a motion in a Y, or longitudinal, direction.

The transducer 418 is moved across tracks 426 of the disc 424 in response to a controlled voltage applied between the positive 420, 421 and the negative 422, 423 electrical contacts. The degree, or intensity, of movement of the first piezoelectric element 405 in response to the excitement is dependent upon the voltage applied between the positive electrical contact 420 and the negative electrical contact 422. Additionally, the degree of movement of the first piezoelectric element 405 may be related to the positioning of positive electrical contact 420 and the negative electrical contact 422 of which the voltage is applied. Likewise, the degree, or intensity, of movement of the second piezoelectric element 407 in response to the excitement are dependent upon the voltage applied between the positive electrical contact 421 and the negative electrical contact 423. Additionally, the degree of movement of the second piezoelectric element 407 may be related to the positioning of the positive electrical contact 421 and the negative electrical contact 423 of which the voltage is applied. Terminal excitement is realized in both the first piezoelectric element 405 and the second piezoelectric element 407 when the voltage is applied such that the piezoelectric elements 405 and 407 have reached maximum excitement, thereby terminally displacing the transducer 418. Terminal displacement is the displacement associated with the maximum range of motion realized by the transducer 118 at maximum excitement.

The first piezoelectric element 405 and the second piezoelectric element 407 are preferably excited such that the direction of movement is solely in the Y direction. If the voltage is applied in order to result in terminal excitement, then the flexure 416 magnifies the movement to move the transducer 418 over a maximum range of motion in the positive Y direction. If a minimal or zero voltage is applied, then the flexure 416 is not magnified and the transducer 418 is fixed at a relatively stationary position. The relatively stationary position may be one of the plurality of park zones, e.g., 120, 220, 222, 224, as described in conjunction with FIG. 1 and FIG. 2. Any voltage having a magnitude between the minimum and the maximum voltage will result in the flexure 416 positioning the transducer 418 a finite displacement less than the terminal displacement. Likewise, if the current location of the transducer 418 is between the outer diameter 432 and the inner diameter 430 or the transducer 418 is at a relatively stationary position on the inner diameter 430, then a reverse potential between the electrical contacts 420, 422 of the first piezoelectric element 405 and a reverse potential between the electrical contacts 421, 423 of the second piezoelectric element 407 results in a movement of the respective elements 405, 407 that contracts the flexure 416 thereby displacing the transducer 418 towards the outer diameter 432.

In accordance with a transducer assembly 218 depicted in FIG. 2, the transducer assembly 418 may include as many transducers as necessary in order to access every track 426 on the disc 424 with at least one transducer. The number of transducers is based upon the maximum range of motion of each transducer across the surface of the disc 424 and the span between the inner diameter 430 and the outer diameter 432 of the disc 424.

An actuator assembly 500 and functional components of the actuator assembly 500 used in controlling accessing of a disc 524 by a transducer assembly 518 in accordance with another embodiment of the present invention is shown in FIG. 5. The actuator assembly 500 includes an actuator arm 502 having a housing 544 for storing an intrinsically excitable element 505. The housing 544 has interior surfaces 540, 542, 546, a top surface (not shown), and a bottom surface 511 for constraining the intrinsically excitable elements 505 within the housing 544.

The housing 544 holds a piezoelectric element 505, which is an intrinsically excitable element preferably composed of a piezoelectric material, such as bulk Lead Zirconate Titanate (PZT). The actuator assembly 500 includes a flexure 516 supported by the actuator arm 502. The flexure 516 includes a motion amplification contact 510. The motion amplification contact 510 relays movements associated with an excitement of the piezoelectric element 505 to the flexure 516. The movement of first motion amplification contact 510 is amplified by the flexure 516. The flexure 516 supports an attached transducer assembly 518 that is positionally displaced from a current location to a desired location upon amplification by the flexure 516. In accordance with a preferred embodiment, the transducer assembly 518 is a single transducer 518.

The piezoelectric element 505 includes at least one positive electrical contact, or surface electrode, 520 and at least one negative electrical contact, or surface electrode, 522 for exciting the piezoelectric element 505 with a voltage. The positive electrical contact 520 and the negative electrical contact 522 are deposited on the front and back surfaces, respectively, of the piezoelectric element 505. Since the negative electrical contact 522 is shown located on the back surface of the first piezoelectric element 505, the negative electrical contact 522 is shown in dashed lines in FIG. 5. The positive 520 and negative 522 electrical contacts may be positioned at any location on the piezoelectric element 505. Additionally, the piezoelectric element 505 might contain any number of electrical contacts 520, 522 respectively.

Excitation in the piezoelectric element 505 occurs as a voltage is applied to the piezoelectric element 505 through the positive 520 and negative 522 electrical contacts. As the piezoelectric element 505 is excited, the motion amplification contact 510 relays movement associated with the excitation to the flexure 516.

The flexure 516 mechanically magnifies the movement associated with the excitement of the piezoelectric element 505 to produce displacement of the transducer 518 across the surface of the disc 524. The flexure 516 magnifies the movement of the piezoelectric element 505 to produce a motion in a Y, or longitudinal, direction. The transducer 518 is moved across tracks 526 of the disc 524 in response to a controlled voltage applied between the positive 520 and the negative 522 electrical contact.

The degree, or intensity, and direction of movement of the piezoelectric element 505 in response to the excitement is dependent upon the voltage applied between the positive electrical contact 520 and the negative electrical contact 522. Terminal excitement is realized in the piezoelectric element 505 when the voltage is applied such that the piezoelectric element 505 has reached maximum excitement, thereby terminally displacing the transducer 518. Terminal displacement is the displacement associated with the maximum range of motion that the transducer 518 may be displaced across the disc 524.

If the voltage is applied in order to result in terminal excitement, then the flexure 516 magnifies the element 505 movement to displace the transducer 518 to the maximum range of motion associated with the transducer 518 in the positive Y direction. If a minimal or zero voltage is applied, then the flexure 516 is not magnified and the transducer 518 is fixed at a relatively stationary position. The relatively stationary position may be one of the plurality of park zones, e.g., 120, 220, 222, 224, as described in conjunction with FIG. 1 and FIG. 2. Any voltage having a magnitude between the minimum and the maximum voltage will result in the flexure 516 positioning the transducer 516 a finite displacement less than the terminal displacement. Likewise, if the current location of the transducer 518 is between the outer diameter 532 and the inner diameter 530 or the transducer 518 is at a relatively stationary position on the inner diameter 530, then a reverse potential between the electrical contacts 520, 522 of the first piezoelectric element 505 results in a movement of the element 505 that contracts the flexure 516 thereby displacing the transducer 516 towards the outer diameter 532.

Figure 6:
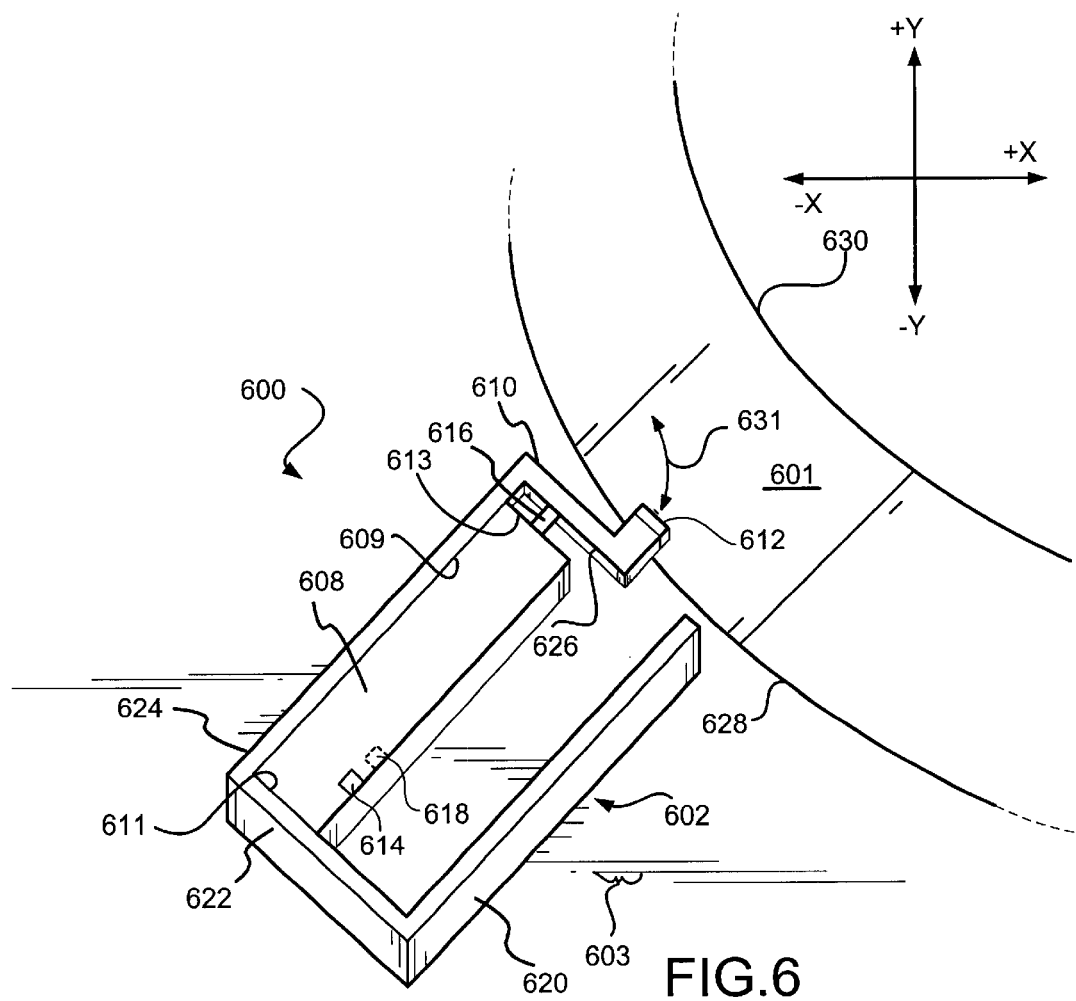
FIG. 6 is a plan view of an actuator assembly constructed in accordance with yet another embodiment of the present invention.

An actuator assembly 600 and functional components of the actuator assembly 600 used in controlling the accessing of a disc 601 by a transducer assembly 612 in accordance with another embodiment of the present invention is shown in FIG. 6. Although the actuator assembly 600 of FIG. 6 is preferably used in a disc drive 100 (FIG. 1), the actuator assembly 600 may also find similar utility in other data storage devices, such as an optical disc drive, a DVD, or any other form of a data storage device where a data storage medium is accessed by a transducer assembly 612. The actuator assembly 600 shown in FIG. 6 includes an actuator arm 602 having a first member 620, a second member 622, a third member 624, and a fourth member 626. At least one of the members 620, 622, 624, and 626 is fastened to a stationary support 603. The stationary support 603 may be the base of the disc drive 100, a support arm, or any other stationary structure in the disc drive 100 having rigid qualities. In the embodiment shown in FIG. 6, the first member 620, the second member 622, and the third member 624 are preferably fastened to the stationary support 603. The fourth member 626 is preferably a flexure 610 that is not fastened to the stationary support 603. The transducer assembly 612 is attached to the flexure 610. In accordance with a preferred embodiment, the transducer assembly 612 is a single transducer 612.

The actuator assembly 600 includes an intrinsically excitable element 608, the excitation in which produces a movement of the intrinsically excitable element 608. The movement of the intrinsically excitable element 608 is amplified, or magnified, by the flexure 610 thereby displacing the attached transducer 612 across the surface of the disc 601. The intrinsically excitable element 608 is coupled to at least one non-flexure member, e.g., 620, 622, or 624, that is rigidly fastened to the stationary support 603 such that no displacement is realized on that member, e.g., 620, 622, or 624, when the intrinsically excitable element 608 is excited, thereby concentrating the excitement of the intrinsically excitable element 608 upon the flexure 610. The intrinsically excitable element 608 is preferably composed of a piezoelectric material. The piezoelectric material is excited by applying a control voltage to the material as described in conjunction with FIG. 4.

The flexure 610 is connected to a motion amplification contact 616. The motion amplification contact 616 presses against the flexure 610. The motion amplification contact 616, via placement of the contact 616, acts similar to a lever in that a force representative of movement of the element 608 is applied to the contact 616 and the contact 616 amplifies the force thereby displacing the flexure 610. Upon excitation, the intrinsically excitable element 608 expands and the motion amplification contact 616 pushes against the flexure 610. The motion associated with the excitement of intrinsically excitable element 608 is mechanically magnified by the flexure 610 to produce displacement of transducer 612 across the surface of the disc 601. The flexure 610 magnifies the movement of the piezoelectric element 608 to produce a motion in a Y, or longitudinal, direction, an X, or latitudinal, direction, or a combined motion in both the X and the Y directions. The displacement of the transducer 612 results in a positioning of the transducer 612 to a destination location on the surface of the disc 601. Terminal displacement of the transducer 612 by the flexure 610 is designed to span the surface of disc 601 between the outer diameter 628 and the inner diameter 630, thereby allowing access to all tracks on the surface of the disc 601.

As mentioned, positional displacement of the transducer 612 is caused by excitation in the intrinsically excitable element 608. The intrinsically excitable element 608 is bounded, at least in part, to a rigidly fastened member, e.g., 620, 622 and 624, and coupled to the flexure 610 via the motion amplification contact 616 thereby concentrating the movement of the intrinsically excitable element 608 on the flexure 610. For example, a side portion 609 and a bottom portion 611 of the intrinsically excitable element 608 are bounded by the rigidly fastened members 624 and 622, respectively and a top portion 613 is coupled to the flexure 610 via the motion amplification contact 616. The flexure 610 may also incorporate the third member 624, as well as the fourth member 626 thereby enabling the transducer 612 to be displaced in combined latitudinal and longitudinal directions across the surface of the disc 601. Additionally, the intrinsically excitable element 608 might be directly coupled to the flexure 610 at the third member 624 and indirectly coupled to the flexure 610 at the fourth member 626 via the motion amplification contact 616.

The intrinsically excitable element 608, which is preferably a piezoelectric material in this embodiment, has a positive electrical contact, or surface electrode, 614 and a negative electrical contact, or surface electrode, 618 for exciting the piezoelectric material with a voltage. Since the negative electrical contact 618 is shown located on a lower surface of the intrinsically excitable element 614, the negative electrical contact 618 is shown in dashed lines in FIG. 6. As a voltage is applied between the electrical contacts 614 and 618, excitation in the intrinsically excitable element 608 is realized due to intrinsically excitable characteristics of the element 608. Excitation is maintained so long as the voltage remains applied between the positive 614 and the negative 618 electrical contacts. The electrical contacts 614 and 618 may be positioned at any location on the intrinsically excitable element 608 in order to control the degree, or intensity, of the excitement in the piezoelectric material.

A movement is caused in the intrinsically excitable element 608 in response to the excitation generated in the element 608. The degree, or intensity, of orientation of movement of the intrinsically excitable element 608 is dependent upon the voltage applied between the positive electrical contact 614 and the negative electrical contact 618, the positions of the electrical contacts 614, 618 receiving the voltage, and the coupling of the intrinsically excitable element 608 to particular members 620, 622, 624 of the actuator arm 602. Displacement of the transducer 612 follows in an arcuate path 631 from an outer diameter 628 on the surface of the disc 601 as referenced against a Cartesian coordinate axis. For example, the arcuate path is preferably oriented towards the positive Y and negative X directions from the outer diameter 628. The magnitude of displacement is dependent upon the magnitude of the controlled voltage applied between the positive electrical contact 614 and the negative electrical contact 618.

Terminal excitation, which is defined by the intrinsic characteristics of the piezoelectric material, results in terminal displacement of the transducer 612 over the surface of the disc 601. Terminal displacement may be the distance on the surface of the disc 601 between the outer diameter 628 and the inner diameter 630. Alternatively, terminal displacement might only be a fraction of the distance between the outer diameter 628 and the inner diameter 630. In this case, the fourth member 626 may support multiple flexures 610 with each flexure 610 having a spaced transducer 612 so as to access the entire surface of the disc 601.

When a maximum voltage is applied the transducer 612 is moved a maximum radial displacement across the disc 601. If a minimal or zero voltage is applied, then the transducer 612 is positioned at a relatively stationary position. This relatively stationary position, may be one of the plurality of park zones, e.g., 120, 220, 222, 224, as described in conjunction with FIG. 1 and FIG. 2. Accordingly, the relatively stationary position may also be adjacent the outer diameter 628 on the surface of the disc 601. Any voltage in between the minimum or the maximum voltage will result in the transducer 612 being positioned a finite displacement between the outer diameter 628 and the inner diameter 630.

Figure 7:
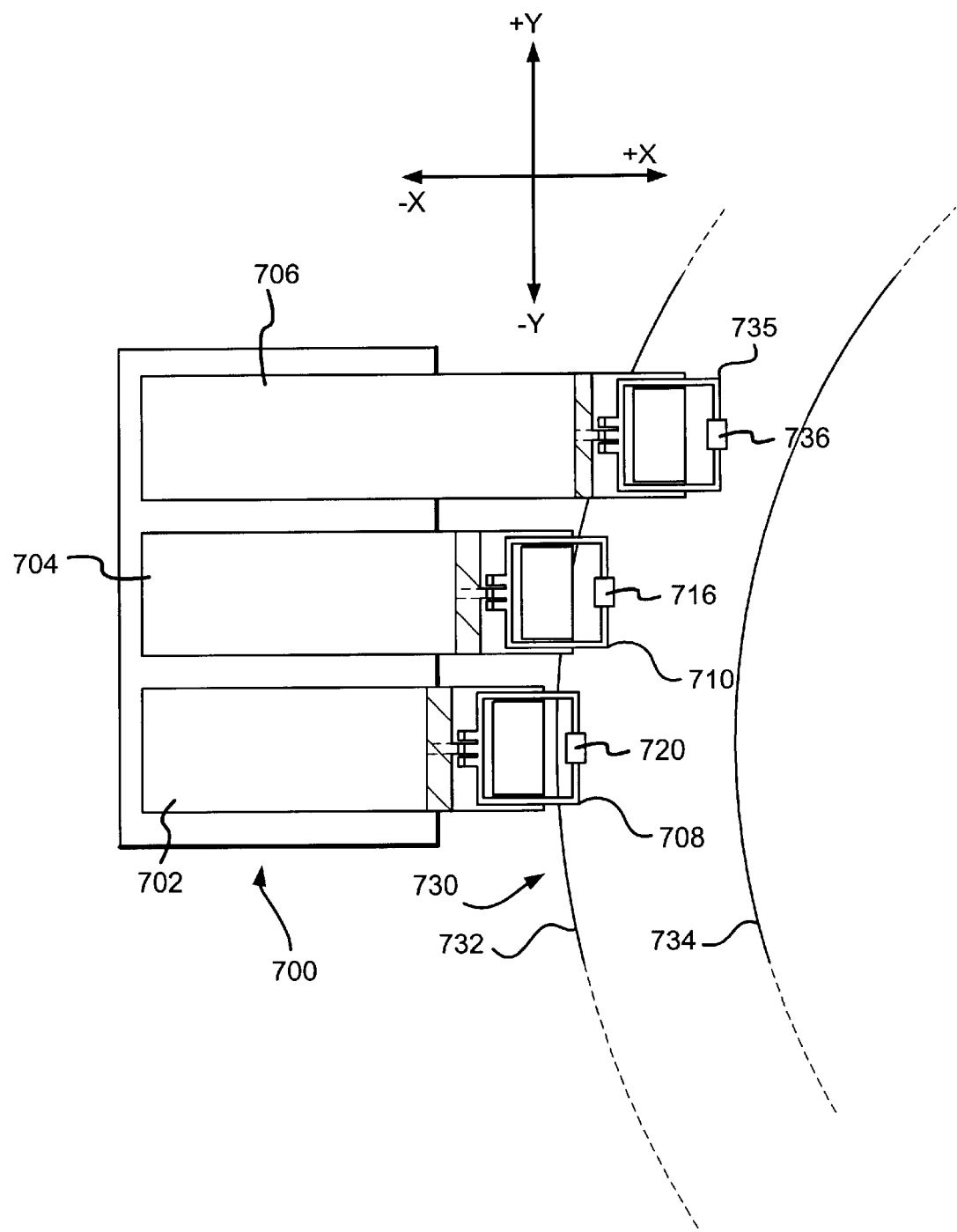
FIG. 7 is a plan view of an actuator assembly having multiple actuator arms in accordance with a still further embodiment of the present invention.

An actuator assembly 700 for accessing the surface of a disc 730 between an inner diameter 732 and an outer diameter 734 in accordance with a still further embodiment of the present invention is shown in FIG. 7. Although the actuator assembly 700 of FIG. 7 is shown as used in a disc drive 100 (FIG. 1), the actuator assembly 700 may find similar utility in other data storage devices, such as an optical disc drive, a DVD, or any other form of a data storage device where a data storage medium is accessed by a transducer assembly, e.g., 716, 720, 736. The actuator assembly 700 includes a first actuator arm 702, a second actuator arm 704, and a third actuator arm 706. As shown in FIG. 7, the actuator arms 702, 704 and 706 may be constructed in accordance with an embodiment depicted in FIG. 4 of FIG. 5. Alternatively, the actuator arms 702, 704 and 706 might be constructed in accordance with an embodiment depicted in FIG. 6.

The first actuator arm 702 supports a first flexure 708, the second actuator arm 704 supports a second flexure 710 and the third actuator arm 706 supports a third flexure 735. Although the flexures 708, 710 and 735 are identified using different numerals in FIG. 7, the flexures 708, 710 and 735 are preferably identical to each other with respect to structure and function. The flexures 708, 710 and 735 are preferably moved by an excitation produced in an intrinsically excitable element composed of piezoelectric material. In order to separately control excitation in the elements inside the actuator arms 702, 704 and 706, excitation in the intrinsically excitable elements within the first actuator arm 702, the second actuator arm 704, and the third actuator arm 706 are preferably administered through separate motion amplification systems 300 (FIG. 3).

The first flexure 708, the second flexure 710, and the third flexure 735 support a first transducer assembly 720, a second transducer assembly 716, and a third transducer assembly 736, respectively. Although the transducer assemblies 720, 716 and 736 are identified using different numerals in FIG. 7, the transducer assemblies 720, 716 and 736 are preferably identical to each other with respect to structure and function. The actuator arms 702, 704, and 706 each hold piezoelectric elements (not shown) that are intrinsically characterized to move in response to an excitement triggered by a control voltage. Upon application of the control voltage, the piezoelectric elements expand and the flexures 708, 710, and 735 mechanically amplify the movement produced in the elements as depicted in conjunction with FIG. 4, FIG. 5, and FIG. 6. The amplification of an associated element displaces one of the transducer assemblies, e.g., 720, 716 and 736, across the disc 630 to a destination location on the disc 730 that is within the range of displacement of that transducer assembly, e.g., 720, 716 and 736. In accordance with a preferred embodiment, each transducer assembly e.g., 720, 716, and 736 is configured to be a single transducer. Displacement of a particular transducer, e.g., 720, 716 and 736 from an origination location on the disc 730 to a destination location define the accessing of the disc 730 by that transducer, e.g., 720, 716 and 736. The actuator arms 702, 704 and 706 have varied lengths such that terminal displacement of the transducers 720, 716 and 736 provide access adjacent areas between the outer diameter 732 and the inner diameter 734 of disc 730. Alternatively, if the ranges of motion of the first transducer 702 and the second transducer 704 are sufficient to provide access to the entire area between the outer diameter 732 and the inner diameter 734, then the actuator assembly 700 may only be designed with the first and second actuators 702, 704. Furthermore, any number of additional actuator arms may be used to provide access to the entire area between the outer diameter 732 and the inner diameter 734 if the maximum ranges of motion associated with the terminal displacements of the first 720, the second 716, and the third 736 transducers together does not provide sufficient coverage of the disc 630.

In summary, the present invention may be viewed as a device (such as 500) for controlling the position of a transducer assembly (such as 518) relative to a data storage medium (such as 524) in order to write data to and read data from the medium (such as 408). The device (such as 110) includes an elongated flexure (such as 516) operably supporting the transducer assembly (such as 518) at any radial location on the storage medium (such as 524). The device (such as 500) also comprises an intrinsically excitable element (such as 505) contacting the flexure (such as 516). The intrinsically excitable element (such as 505) moves in response to an excitation applied to the intrinsically excitable element (such as 505) and the elongated flexure (such as 516) amplifies the movement of the intrinsically excitable element to selectively position the transducer assembly (such as 518) at the desired radial location on the data storage medium (such as 524).

The data storage medium (such as 524) is a recordable disc (such as 524) of a disc drive (such as 100) and the desired radial location is a track (such as 526) on the recordable disc (such as 524). The device (such as 500) includes an actuator arm (such as 502) supporting the elongated flexure (such as 516) for movement over the recordable disc (such as 524). The actuator arm (such as 502) is attached to a stationary support (such as 603) and has an interior surface (such as 540, 542, 546) constraining a portion of the intrinsically excitable element (such as 505) such that the movement produced by the excitation is concentrated to a point of contact (such as 510) between the intrinsically excitable element (such as 505) and the elongated flexure (such as 516).

The actuator arm (such as 502) includes a housing (such as 544) holding the intrinsically excitable element (such as 505). The housing (such as 544) is bounded by the interior surface (such as 540, 542, 546) of the actuator arm (such as 502). The housing (such as 444) may be divided by a boundary (such as 408) into more than one reservoir (such as 404 and 406). Each reservoir (such as 404 and 406) holds a different intrinsically excitable element (such as 405 and 407).

The device (such as 500) also includes a controller (such as 306) connected to the intrinsically excitable element (such as 505). The controller (such as 306) generates a control signal (such as 314) that initiates and maintains the excitation in the intrinsically excitable element (such as 505). The intrinsically excitable element (such as 505) comprises a piezoelectric material (such as 505) that expands and contracts in response to the excitation applied to the material (such as 505). The expansion and contraction of the piezoelectric material (such as 505) locates the transducer assembly (such as 518) over the desired location (such as 426) by in an arcuate path (such as 631 could not find 331) from an outer diameter (such as 532) on the recordable disc (such as 524). The controller (such as 306) applies a voltage to the piezoelectric material (such as 505) to generate the excitation in the piezoelectric material (such as 505). The piezoelectric material (such as 608) is an elongated body positioned between a stationary support (such as 622) and the elongated flexure (such as 610).

The intrinsically excitable element (such as 505) may also comprise a magnetostrictive material (such as 505) that expands and contracts in response to the excitation applied to the material (such as 505). If the intrinsically excitable element (such as 505) is magnetostrictive material (such as 505), the control signal (such as 314) applies a magnetic field around the magnetostrictive material (such as 505) to generate the excitation in the magnetostrictive material (such as 505).

The elongated flexure (such as 216) operably supports a transducer assembly (such as 218) over the recordable disc (such as 208). The transducer assembly (such as 218) may have more than one transducer (such as 217, 219, 221), wherein each transducer (such as 217, 219, 221) is spaced by the elongated flexure (such as 216) to access a predetermined radial section on the data storage medium (such as 208).

The present invention may also be viewed as a method (such as operation 800) for positioning a transducer assembly (such as 518) at any desired location relative to a data storage medium (such as 524) in order to access, or write data to and read data from, the medium (such as 524). The method includes exciting (such as operation 810) an intrinsically excitable element (such as 505) using the control parameter to produce a movement of the excitable element (such as 505) and amplifying (such as operation 812) the movement to selectively position the transducer (such as 518) over any desired location on the data storage medium (such as 524) between an outer diameter (such as 532) and an inner diameter (such as 530). The method (such as operation 800) also includes determining (such as operation 808) a control parameter associated with the signal (such as 314) to position a transducer (such as 518) over a desired location on the medium (such as 524). The control parameter is determined based upon a current location of the transducer (such as 518). The method (such as operation 800) also includes applying the control parameter to the intrinsically excitable element (such as 505) to generate an excitement in the element (such as 505).

The determining step (such as operation 808) establishes the control parameter based on information identifying the current location relative to the desired location. The exciting step (such as operation 810) includes exciting a piezoelectric material (such as 505) by applying a voltage applied to the piezoelectric material (such as 505) to produce the movement. The amplifying step (such as operation 812) is administered through an elongated flexure (such as 516) supporting the transducer assembly (such as 518). The intrinsically excitable element (such as 505) is constrained on at least one side by an actuator arm (such as 502) attached to a stationary support (such as 603). Additionally, the intrinsically excitable element (such as 505) is operably connected to a contact point (such as 510) of the elongated flexure (such as 516).

The method (such as operation 800) also includes concentrating the movement of the intrinsically excitable element (such as 505) on the contact point (such as 510) on the elongated flexure (such as 516). The amplifying step (such as operation 812) occurs as the movement is realized at the contact point (such as 510). The method (such as operation 800) also includes accessing (such as operation 815) a desired track (such as 526) of a recordable disc (such as 524) in a disc drive (such as 100) with the transducer assembly (such as 518). The transducer assembly (such as 518) is positionally displaced from an origination location on the recordable disc (such as 524) to the desired track (such as 526). The accessing step (such as operation 815) positionally displaces the transducer assembly (such as 518) over a dynamic range extending from an outer diameter (such as 532) of the recordable disc (such as operation 524) to an inner diameter (such as 530) of the recordable disc (such as 524). The accessing step (such as operation 815) also positionally displaces a plurality of transducers (such as 218). Each transducer (such as 217, 219, 221) is supported by a flexure (such as 216) and the plurality of transducers (such as 217, 219, 221) are spaced by the flexures (such as 216) to access a dynamic range extending from an outer diameter (such as 232) to an inner diameter (such as 230) of the recordable disc (such as 208).

The present invention may also be viewed as an actuator assembly (such as 500) for positioning a transducer (such as 518) relative to a data storage medium (such as 524) in order to write data to and read data from the medium (such as 524). The actuator assembly (such as 500) includes an intrinsically excitable element (such as 505) excited by a control means (such as 306) to produce a movement of the intrinsically excitable element (such as 505) and a mechanical amplification means (such as 516) for amplifying the movement of the intrinsically excitable element (such as 505) to selectively position the transducer (such as 518) over a desired location on the data storage medium (such as 524).

It will be clear that the present invention is well adapted to attain the ends and advantages mentioned, as well as those inherent therein. While a presently preferred embodiment has been described for purposes of this disclosure, various changes and modifications may be made which are well within the scope of the present invention. For example, alternative intrinsically excitable materials may be used with the capability to produce larger displacements with favorable operating conditions such as lower operating voltages. As with piezoelectric materials, these alternative materials may be used in bulk form or deposited on a substrate as a thin film using various techniques such as sputtering. Some examples of alternative materials with intrinsic actuation properties are electrostrictive materials, such as Lead Magnizium Niobate (PMN), and magnetostrictive materials. If the material is magnetostrictive, the intrinsically excitable element 608 does not contain electrical contacts, but instead is wrapped by a coil, or winding, to which a voltage is applied to produce a current through the coil to generate a magnetic field to excite the magnetostrictive material.

If the intrinsically excitable element is a magnetostrictive material, the voltage (control parameter) is applied to the coil to generate a magnetic field. The control parameters applied to Lead Zirconate Titanate (PZT), or other piezoelectric materials, are associated with a relatively higher voltage than the control parameters applied to the windings around magnetostrictive materials. Indeed, if the intrinsically excitable element is a material other than piezoelectric material, the control parameter used to excite the element may be a parameter other than a voltage. For example, a control parameter for exciting the magnetostrictive material may be based upon the magnitude of the current conducted through the coil. Furthermore, control of the actuator may be administered through the use of more than one control parameter. For instance, higher voltages and low currents may be needed by bulk PZT while lower voltages and currents may be needed for the windings responsible for creating a magnetic field around a magnetostrictive composed element.

Additionally, the motion amplification system 300 (FIG. 3) may be used to position a transducer assembly 218 that is configured to have more than one transducer in accordance with an alternate embodiment. For example, the motion amplification system 300 may be used to control an actuator assembly 210 supporting multiple transducers, e.g. 217, 219, 221, as shown in FIG. 2. Referring to FIG. 2, the output of the motion amplification system 300 may position multiple transducers, e.g. 217, 219, 221, on various positions between the outer diameter 238 and the inner diameter 236 on the disc 208 to be accessed. By controlling the position of the multiple transducers, e.g. 217, 219, 221, any track of data on the surface area of the disc 208 may be accessed under control of the motion amplification system 300. In particular, the motion amplification system 300 preferably directs one of the multiple transducers, e.g. 217, 219, 221, to access a range of locations on the recordable disc 208 between the outer 238 and inner 236 diameters on the surface of the disc 208. Thus, access to any location on the surface of the disc 208 may be provided by the motion amplification system 300 via one of the multiple transducers, e.g. 217, 219, 221.

Furthermore, the flow diagram 800 shown in FIG. 8 may also be used to illustrate operational control of a transducer assembly 218 having multiple transducer configuration, such as the embodiment shown in FIG. 2. In this case, positional information related to the current location of all the transducers may be used by the displacement operation 808 of the flow diagram 800. Additionally, the excitation 810 and amplification 812 operations may administered to move multiple transducers, e.g. 217, 219, 221, such as the multiple transducers 218 shown in FIG. 2. The excitation 810 and amplification 812 operations may also be administered to multiple excitable elements 405, 407, as shown in FIG. 4, to move either a single flexure 116 supporting a single transducer 118, as shown in FIG. 1, or multiple flexures 216 each having each having a single transducer, e.g. 217, 219, 221, as shown in FIG. 2.

Various changes and modifications may also be made to the embodiment described in conjunction with FIG. 4 which are well within the scope of the present invention. For example, the first 404 and the second 406 element reservoirs may hold an intrinsically excitable element composed of a material other than piezoelectric material, such as a magnetostrictive material. In this case, the magnetostrictive material may be wrapped with a coil, or winding, through which a current is passed to generate an excitement in the magnetostrictive material.

Additionally, various changes and modifications may also be made to the embodiment described in conjunction with FIG. 6 which are well within the scope of the present invention. For example, the fourth member 626 may contain multiple flexures 610, with each flexure 610 supporting a transducer assembly 612. By constructing an actuator assembly 600 with multiple flexures 610 and transducer assemblies 612, any track on the surface of the disc 601 between the inner diameter 628 and the outer diameter 630 may be accessed by the actuator assembly 600.

Numerous other changes may be made which will readily suggest themselves to those skilled in the art and which are encompassed in the spirit of the invention disclosed and as defined in the appended claims.

What is claimed is:

1. An actuator assembly for positioning a transducer assembly relative to a data storage medium in order to write data to and read data from the data storage medium, the actuator assembly comprising:
   an intrinsically excitable element excited by a control means to produce a longitudinal movement of the intrinsically excitable element relative to an inner and an outer diameter of the data storage medium; and
   mechanical amplification means connected to the element and the transducer assembly for amplifying the longitudinal movement of the intrinsically excitable element to selectively position the transducer assembly at any desired location between the outer diameter and the inner diameter on the data storage medium.

2. An actuator assembly as defined in claim 1 wherein the intrinsically excitable element comprises a piezoelectric material.

3. An actuator assembly as defined in claim 1, wherein the intrinsically excitable element comprises a magnetostrictive material.

4. An actuator assembly as defined in claim 1, wherein the mechanical amplification means amplifies the longitudinal movement of the intrinsically excitable element to selectively position the transducer assembly in an arcuate path from the outer diameter on the data storage medium.

5. A device for controlling the position of a transducer assembly relative to a recordable disc in a disc drive in order to write data to and read data from a desired location on the recordable disc, the device comprising:
   an elongated flexure operably supporting the transducer assembly;
   an intrinsically excitable element contacting the elongated flexure, wherein the elongated flexure amplifies a movement by the intrinsically excitable element in response to an excitation applied to the intrinsically excitable element and wherein the amplification by the elongated flexure is operable to selectively position the transducer assembly to write data to and read data from all radial locations on the recordable disc; and
   an actuator arm supporting the elongated flexure for movement over the recordable disc, the actuator arm being attached to a stationary support and comprising a housing holding the intrinsically excitable element and being bounded by an interior surface of the actuator arm, the interior surface constraining a portion of the intrinsically excitable element such that the movement produced by the excitation is concentrated at a point of contact between the intrinsically excitable element and the elongated flexure.

6. A device as defined by claim 5, wherein the transducer assembly is a single transducer configuration operable to write data to and read data from all radial locations on the disc.

7. A device as defined by claim 5, wherein the transducer assembly comprises a plurality of transducers, wherein each transducer is spaced by the elongated flexure to access a predetermined radial segment on the recordable disc.

8. A device as defined in claim 5, further comprising:
   a controller connected to the intrinsically excitable element, wherein the controller generates a control signal that initiates and maintains the excitation in the intrinsically excitable element.

9. A device as defined in claim 8, wherein the intrinsically excitable element comprises a piezoelectric material that expands and contracts in response to the excitation applied to the material.

10. A device as defined in claim 9, wherein the controller applies a voltage to the piezoelectric material to generate the excitation in the piezoelectric material.

11. A device as defined in claim 9, wherein expansion and contraction of the piezoelectric material locates the transducer assembly at a desired location by displacing the transducer assembly in an arcuate path from an outer diameter on the recordable disc.

12. A device as defined in claim 8, wherein the intrinsically excitable element comprises magnetostrictive material that expands and contracts in response to the excitation applied to the material.

13. A device as defined in claim 12, wherein the control signal applies a magnetic field around the magnetostrictive material to generate the excitation in the magnetostrictive material.

14. A device as defined by claim 5, wherein the housing comprises:
   a first portion containing a first intrinsically excitable element, wherein the first intrinsically excitable element contacts a first contact point of the elongated flexure such that movement by the first intrinsically excitable element produced in response by an excitation applied thereto is operable to selectively position the transducer assembly to write data to and read data from radial locations on the recordable disc; and
   a second portion containing a second intrinsically excitable element, wherein the second intrinsically excitable element contacts a second contact point of the elongated flexure such that movement by the second intrinsically excitable element produced in response by an excitation applied thereto is operable to selectively position the transducer assembly to write data to and read data from radial locations on the recordable disc, the first and second portion of the housing being separated by a fixed boundary within the housing.

15. A device as defined by claim 14, wherein movement of the first intrinsically excitable element displaces the transducer assembly in an arcuate path in a first direction from an outer diameter on the recordable disc.

16. A device as defined by claim 15, wherein movement of the second intrinsically excitable element displaces the transducer assembly in an arcuate path in a second direction from the outer diameter on the recordable disc.

17. A device for controlling the position of a transducer assembly relative to a recordable disc in order to write data to and read data from a desired location on the recordable disc, the device comprising:

an actuator arm supporting the transducer assembly over the recordable disc, wherein the actuator arm comprises an interior surface and an exterior surface; and a housing bounded by the interior surface of the actuator arm and containing an intrinsically excitable element, wherein the intrinsically excitable element moves in response to an excitation applied to the intrinsically excitable element and wherein movement by the intrinsically excitable element is operable to selectively position the transducer assembly to write data to and read data from radial locations on the recordable disc and operable to displace the transducer assembly in a longitudinal path relative to an outer diameter and an inner diameter on the recordable disc.

18. A device for controlling the position of a transducer assembly relative to a recordable disc in order to write data to and read data from a desired location on the recordable disc, the device comprising:

an actuator arm supporting the transducer assembly over the recordable disc, wherein the actuator arm comprises an interior surface, an exterior surface and an elongated flexure operably supporting the transducer assembly over the recordable disc; and a housing bounded by the interior surface of the actuator arm and comprising:

a first portion containing a first intrinsically excitable element, wherein the first intrinsically excitable element moves in response to an excitation applied thereto and wherein the movement by the first intrinsically excitable element is concentrated on a first contact point of the elongated flexure such that the movement by the first intrinsically excitable element is operable to selectively position the transducer assembly to write data to and read data from radial locations on the recordable disc; and a second portion containing a second intrinsically excitable element, wherein the second intrinsically excitable element moves in response to an excitation applied thereto and wherein the movement by the second intrinsically excitable element is concentrated on a second contact point of the elongated flexure such that the movement by the second intrinsically excitable element is operable to selectively position the transducer assembly to write data to and read data from radial locations on the recordable disc, the first and second portion of the housing being separated by a fixed boundary within the housing.

19. A device as defined in claim 18, wherein movement of the first intrinsically excitable element displaces the transducer assembly in an arcuate path in a first direction from an outer diameter on the recordable disc.

20. A device as defined in claim 19, wherein movement of the second intrinsically excitable element displaces the transducer assembly in an arcuate path in a second direction from the outer diameter on the recordable disc.

* * * * *